United States Patent
Yonekubo et al.

(10) Patent No.: US 7,477,435 B2
(45) Date of Patent: Jan. 13, 2009

(54) PROJECTOR

(75) Inventors: Masatoshi Yonekubo, Hana-mura (JP); Takashi Takeda, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/456,285

(22) Filed: Jul. 10, 2006

(65) Prior Publication Data

US 2007/0019921 A1    Jan. 25, 2007

(30) Foreign Application Priority Data

Jul. 20, 2005    (JP) .............................. 2005-210059

(51) Int. Cl.
G02B 26/08    (2006.01)

(52) U.S. Cl. ................... 359/196; 359/599; 359/227; 359/234; 359/235; 362/351; 362/311; 362/355; 362/235; 362/246

(58) Field of Classification Search ................... None
See application file for complete search history.

(56) References Cited

U.S. PATENT DOCUMENTS

| | | | |
|---|---|---|---|
| 4,035,068 A * | 7/1977 | Rawson | ................... 353/122 |
| 5,313,479 A | 5/1994 | Florence | |
| 5,365,364 A * | 11/1994 | Taylor | ................... 359/208 |
| 6,323,984 B1 * | 11/2001 | Trisnadi | ................... 359/245 |
| 6,594,090 B2 | 7/2003 | Kruschwitz et al. | |
| 6,747,781 B2 * | 6/2004 | Trisnadi | ................... 359/279 |
| 2004/0090679 A1 * | 5/2004 | Kowarz | ................... 359/634 |

FOREIGN PATENT DOCUMENTS

| | | |
|---|---|---|
| JP | 06-208089 | 7/1994 |
| JP | A 07-67064 | 3/1995 |
| JP | A 2002-90881 | 3/2002 |
| JP | 2003-098476 | 4/2003 |
| JP | A 2004-233524 | 8/2004 |
| JP | 2004-341211 A | 12/2004 |
| JP | 2005-084117 | 3/2005 |
| JP | A 2005-99160 | 4/2005 |
| JP | 2005-181395 A | 7/2005 |

* cited by examiner

*Primary Examiner*—Sung H Pak
*Assistant Examiner*—Chad H Smith
(74) *Attorney, Agent, or Firm*—Oliff & Berridge, PLC (57) ABSTRACT

A projector includes: a light source device that emits a laser beam toward a projected surface; a scanning unit that scans the laser beam emitted from the light source device; a light diffusion member that diffuses the laser beam used for scanning by the scanning unit; and a converging unit that converges the laser beam going out from the light diffusion member on the protected surface.

9 Claims, 6 Drawing Sheets

PROJECTOR

BACKGROUND

1. Technical Field

The present invention relates to a projector for displaying an image by projecting a light beam emitted from a light source device on a projected surface.

2. Related Art

A projector of a rear projection type that displays an image by scanning a screen (projected surface) with a laser beam has been proposed in the related art. In this projector, since complete black can be displayed by stopping supply of the laser beam, a high-contrast display is possible in comparison with, for example, a projector that employs a liquid crystal light valve. Since the laser beam is high in directivity, a projection optical system can be simplified. Therefore, the projector can be formed into a compact and simple structure. In addition, color display is achieved easily by combining a plurality of colors of laser beams such as red, green and blue, and since the laser beam is high in monochromaticity, the color display with high color purification is achieved.

As the projector of the rear projection type, a projection type laser image display device employing a red laser source, a green laser source, and a ultra-violet laser source is proposed (for example, see JP-A-7-67064). The projection type laser image display device disclosed in JP-A-7-67064, a fluorescent material is applied on a screen, and hence the laser beams emitted form the red laser source and the green laser source are dispersed on the screen surface. The laser beam emitted from the ultra-violet laser source is excited by the fluorescent material, which generates blue light. This blue light is diffused on the screen surface.

In the case in which the projector of the rear projection type as described above is employed, there is a problem such that dazzling, which is called "scintillation" or "speckle" may occur in the laser beam projected onto the screen. According to the projection type laser image display device disclosed in JP-A-7-67064, since the laser beam is diffused on the screen, occurrence of the dazzling cannot be resolved satisfactorily. When the screen is accidentally damaged by means of an unexpected cause, the laser beam may be irradiated directly toward the outside without being diffused. Therefore, the reliability of the entire device is not sufficient.

SUMMARY

An advantage of some aspects of the invention is to provide a projector in which occurrence of dazzling of a laser beam projected on a screen is reduced, and reliability of the entire device can be improved.

A projector according to an aspect of the invention includes a light source device that emits a laser beam toward a projected surface; a scanning unit that scans the laser beam emitted from the light source device; a light diffusion member that diffuses the laser beam used for scanning by the scanning unit; and a converging unit that converges the laser beam going out from the light diffusion member on the projected surface.

In this arrangement, the laser beam emitted from the light source device is used for scanning by the scanning unit, and enters the light diffusion member. The laser beam entered into the light diffusion member is diffused, and then converges on the projected surface by the converging unit. Therefore, by diffusing the laser beam emitted from the light source device by the light diffusion member, coherence of the laser beam converged on the projected surface is lowered, and hence occurrence of dazzling (scintillation, speckle) can be restricted. Since the laser beam emitted from the light source device is diffused by the light diffusion member before being converged by the converging unit, even when the projected surface is accidentally damaged due to an unexpected cause, the laser beam with high intensity is prevented from being emitted toward the outside, and hence the reliability of the entire device can be improved.

Preferably, the projector includes another converging unit that converges the laser beam emitted from the light source device onto the light diffusion member.

In this arrangement, the laser beam emitted from the light source device is converted on the light diffusion member by another converging unit. Therefore, the laser beam emitted from the light source device enters the light diffusion member without being scattered on the outside of the light diffusion member, and hence the efficiency for utilizing the laser beam emitted from the light source device can be improved.

Preferably, the projector includes a collimating unit that collimates the laser beam emitted from the scanning unit.

In this arrangement, the laser beam emitted from the light source device and used for scanning by the scanning unit is passed through the collimating unit, and then enters the light diffusion member. At this time, the laser beam entering into the light diffusion member is collimated by the collimating unit. Therefore, the laser beam going out from the light diffusion member is converted into the laser beam having directivity in the direction substantially vertical to the light diffusion member. Consequently, since the width of the luminous flux going out from the light diffusion member and incoming into the converging unit is determined by the collimating unit, the converging means can be designed easily.

Preferably, the projector includes a diffused state changing unit that temporarily changes the diffused state of the laser beam emitted from the light diffusion member.

In this arrangement, with the provision of the diffused state changing unit, the diffused state of the laser beam passed through the light diffusion member is temporarily changed. In other words, since the dazzling pattern of the laser beam passed through the light diffusion member is temporarily changed, it is temporality integrated by the after image effect, and hence occurrence of the speckle pattern of the laser beam can be prevented. Consequently, the laser beam projected on the projected surface by the converging unit is the laser beam in which dazzling is restricted. Therefore, an image with good quality can be displayed on the projected surface.

Preferably, the diffused state changing unit is rotational unit that rotates the light diffusion member within an incoming surface of the light diffusion member.

In this arrangement, the light diffusion member is rotated within the incoming surface by the rotational unit and temporarily changes the diffused state of the laser beam emitted from the light source device. In other words, the laser beam emitted from the light diffusion member and projected on the projected surface by the converging unit is uniformized by the rotation of the light diffusion member. Therefore, uneven brightness is reduced, and the rough impression is eliminated. Accordingly, the image of a good quality can be displayed on the projected surface with a simple structure.

Preferably, the diffused state changing unit is a moving unit that moves the light diffusion member within the incoming surface of the light diffusion member.

In this arrangement, the light diffusion member is moved within the incoming surface by the moving unit and the diffused state of the laser beam emitted from the light source device is temporarily changed. Accordingly, uneven brightness of the laser beam emitted from the light diffusion member and projected on the projected surface by the converging unit is reduced and the rough impression is eliminated therefrom. Therefore, downsizing of the entire device is enabled and an image of a good quality can be displayed on the projected surface.

BRIEF DESCRIPTION OF THE DRAWINGS

The invention will be described with reference to the accompanying drawings, wherein like numbers reference like elements.

DESCRIPTION OF EXEMPLARY EMBODIMENTS

Referring now to the drawings, embodiments of the invention will be described. In order to show members in recognizable dimensions, reduction scales of the respective members are changed as needed in the respective drawings.

Figure 1:
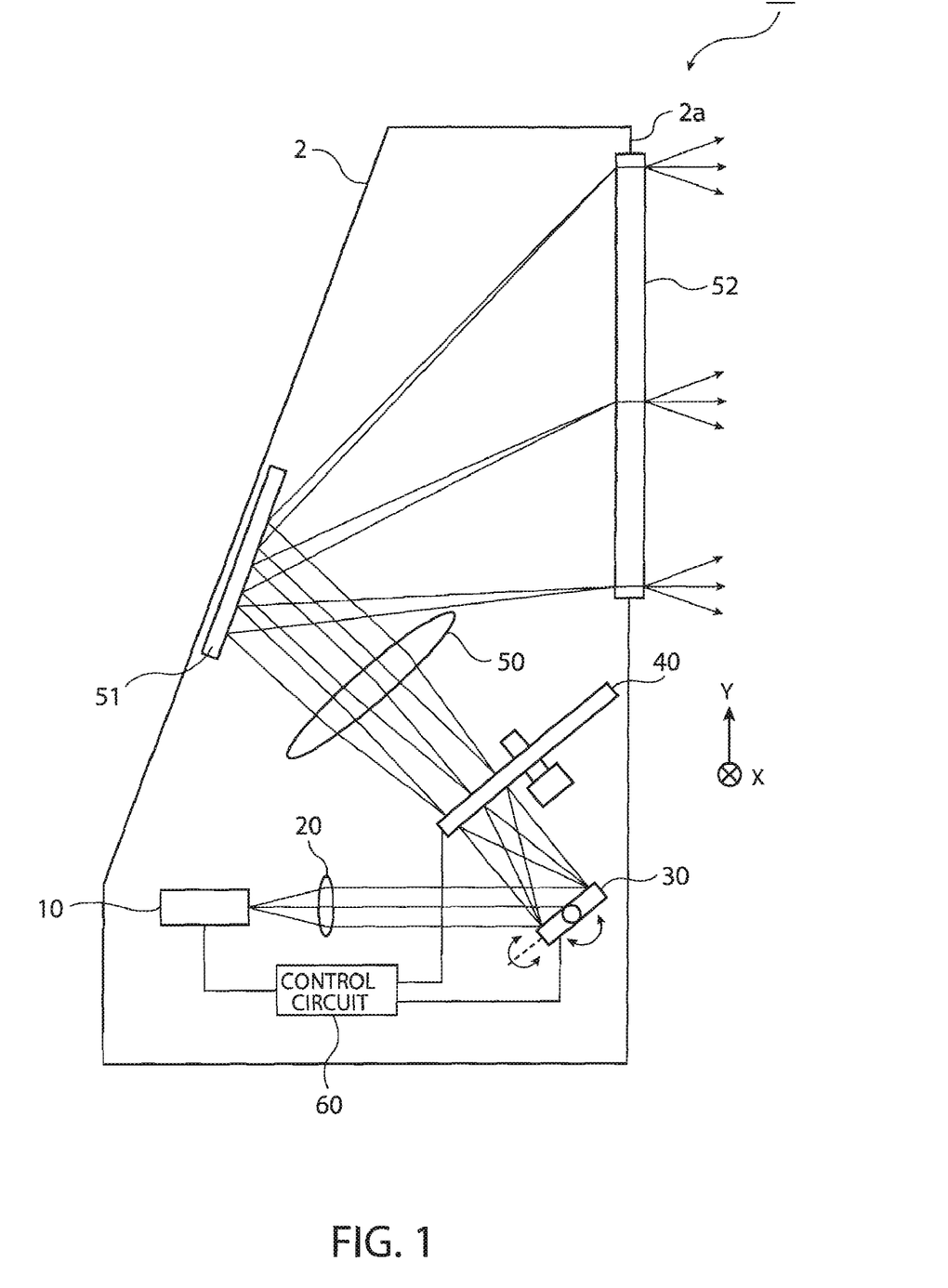
FIG. 1 is a schematic drawing showing a structure of a projector according to a first embodiment of the invention.
Figure 2A:
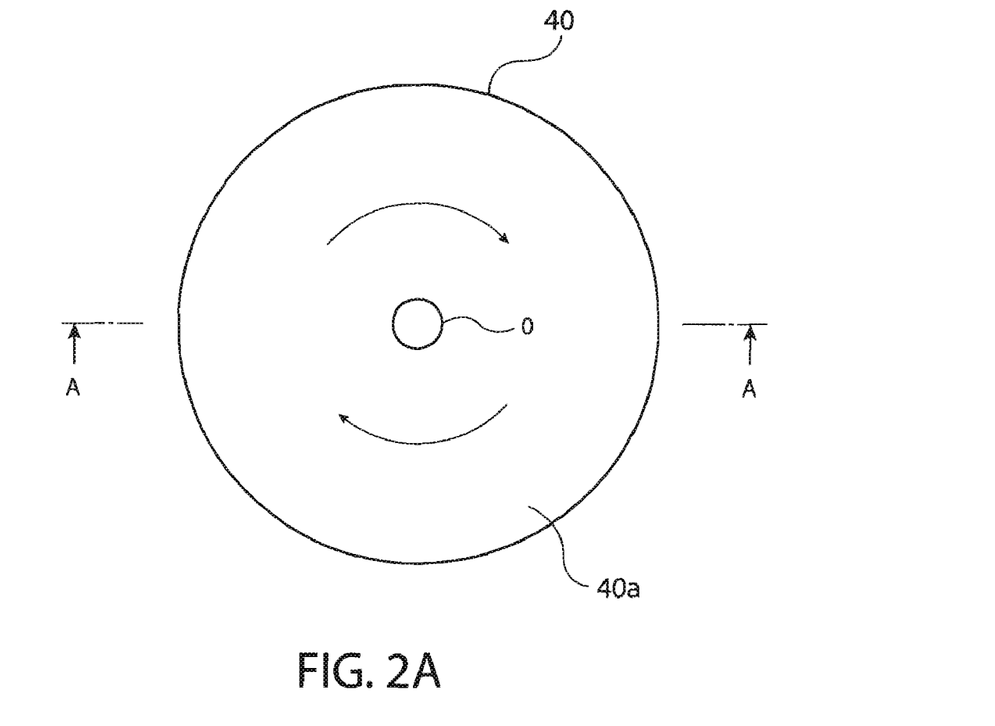
FIG. 2A is a plan view of a light diffusion member shown in FIG. 1.
Figure 2B:
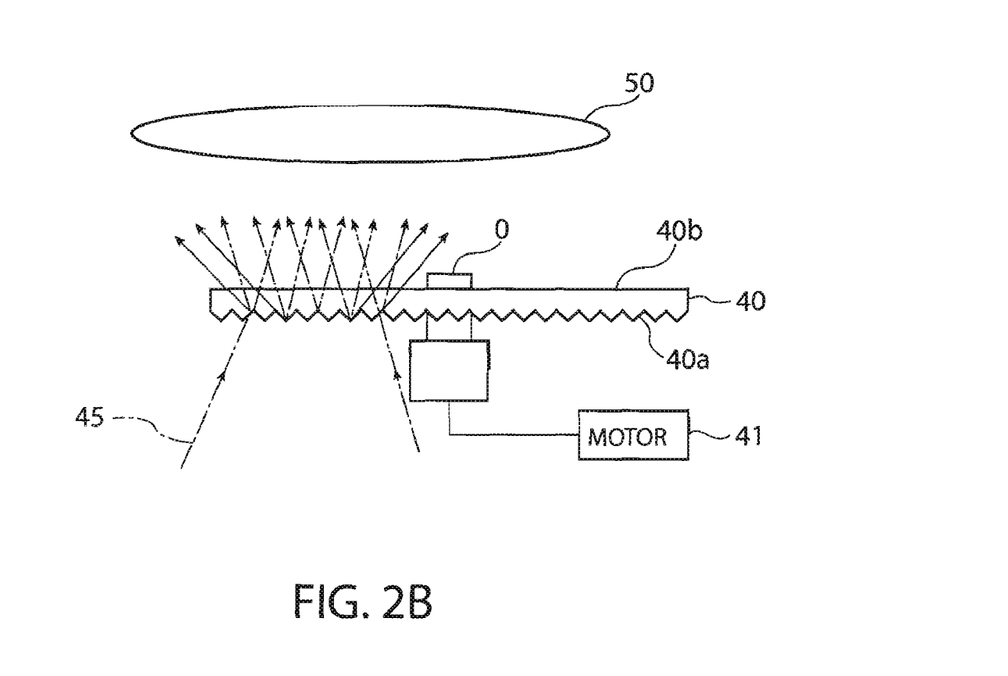
FIG. 2B is a plan view showing a state of a laser beam going out from the light diffusion member viewed in the direction indicated by the line A-A in FIG. 2A.

Referring now to FIG. 1 and FIGS. 2A and 2B, a first embodiment of the invention will be described.

As a projector according to the first embodiment, a rear type laser projector that irradiates a laser beam from the rear surface of a screen will be described.

A projector 1 is provided in an enclosure 2, and includes a light source device 10 that emits a laser beam, a galvanometer mirror (scanning unit) 30 that performs scanning in the two-dimensional direction via a converging lens (another converging unit) 20 with the laser beam emitted from the light source device 10, a light diffusion plate (light diffusion member) 40 for diffusing light beam supplied from the galvanometer mirror 30 for scanning, and a projection lens (converging unit) 50 for causing the laser beam incoming from the light diffusion plate 40 to be projected onto a reflection mirror 51, and a control circuit 60 for controlling the light source device 10, the galvanometer mirror 30 and the light diffusion plate 40 as shown in FIG. 1. The reflection mirror 51 is provided so as to oppose a screen (projected surface) 52 provided on a surface 2a of the enclosure 2 for projecting the laser beam emitted from the projection lens 50 onto the screen 52. The converging lens 20 converges laser beam emitted from the light source device 10 onto the light diffusion plate 40.

The light source device 10 is provided on the side of the screen 52 opposite from an observing side (within the enclosure 2 in the first embodiment), so that a laser beam of high intensity according to the image signal from the control circuit 60 is outputted.

The galvanometer mirror 30 is rotatably provided about two axes; X-axis and Y-axis that are orthogonal to each other so as to be tilted in a desired angular direction. The galvanometer mirror 30 forms an image by performing scanning in the two-dimensional direction with the laser beam emitted from the converging lens 20. An operation of the galvanometer mirror 30 is synchronized with image output from the light source device 10 by a control circuit 60.

The light diffusion plate 40 is formed of a disk-shaped frost glass having minute projections and depressions on an incoming surface 40a as shown in FIG. 2A. The light diffusion plate 40 is provided with a diffused state changing unit that temporarily changes the diffused state of the laser beam entering from the incoming surface 40a and going out from an outgoing surface 40b of the light diffusion plate 40. In the first embodiment, a motor (rotational unit) 41 that rotates the light diffusion plate 40 within the incoming surface 40a as shown in FIG. 2B is provided as the diffused state changing unit, and the light diffusion plate 40 can be rotated about a rotational axis 0 by the control circuit 60. Accordingly, a laser beam 45 entered from the incoming surface 40a of the light diffusion plate 40 is diffused when being emitted from the outgoing surface 40b and is proceeded toward the injection lens 5 as shown in FIG. 2B. The motor 41 is rotated at a rotational speed of at least approximately 70 Hz.

The light diffusion plate 40 has a light permeable property, and is preferably a glass formed of inorganic material when heat-resistance is specifically considered.

An NA of the projection lens 50 is designed on the basis of a diffusing power of the laser beam emitted from the light diffusion plate 40. In this arrangement, the laser beam emitted from the light diffusion plate 40 can be converged by the projection lens 50 without wasting the laser beam, and hence the efficiency for laser utilization can be improved. The projection lens 50 enlarges the laser beam passed through the light diffusion plate 40 and projects the same on the reflection mirror 51.

Subsequently a method of projecting the image on the screen 52 will be described using the projector 1 according to the first embodiment arranged as described above.

When the light source device 10 is driven, a laser beam is emitted from the light source device 10 to the converging lens 20. Then the laser beam converged by the converging lens 20 is used for scanning in the two-dimensional direction along the X-axis and the Y-axis by the galvanometer mirror 30, and is emitted to the light diffusion plate 40. The laser beam entered into the light diffusion plate 40 is uniformized since it is rotated by the motor 41, and hence a laser beam in which occurrence of the speckle pattern is reduced is achieved. Then, the laser beam is projected on the screen 52 by the projection lens 50 via the reflection mirror 51.

In the projector 1 according to the aspect of the invention, since the laser beam emitted from the light source device 10 is diffused by the light diffusion plate 40, the laser beam projected on the screen 52 is reduced in coherence, and hence occurrence of dazzling (scintillation, speckle) is restrained. The laser beam emitted from the light source device 10 is diffused by the light diffusion plate 40 before being converged by the projection lens 50. Therefore even when the screen 52 is accidentally damaged by an unexpected cause, the laser beam with high intensity is prevented from being emitted toward the outside, and hence reliability of the entire projector 1 can be improved.

With the provision of the motor 41, the laser beam emitted from the light diffusion plate 40 and projected on the screen 52 by the projection lens 50 is uniformized by the rotation of the light diffusion plate 40. Therefore, uneven brightness is alleviated, and the rough impression is eliminated. Therefore, a desirable image can be displayed on the projected surface by a simple structure.

Second Embodiment of Projector

Figure 3:
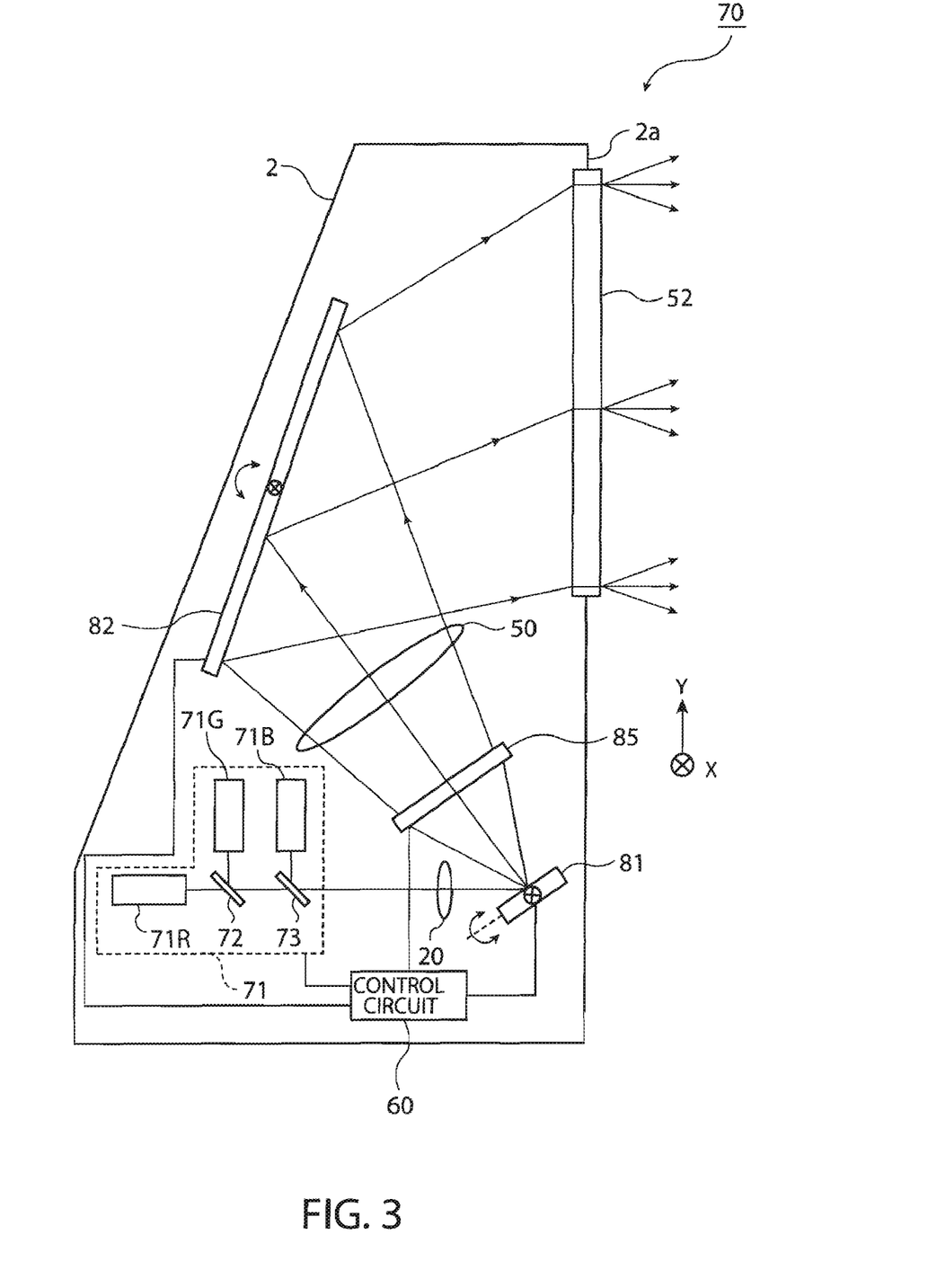
FIG. 3 is a schematic drawing showing a structure of a projector according to a second embodiment of the invention.
Figure 4:
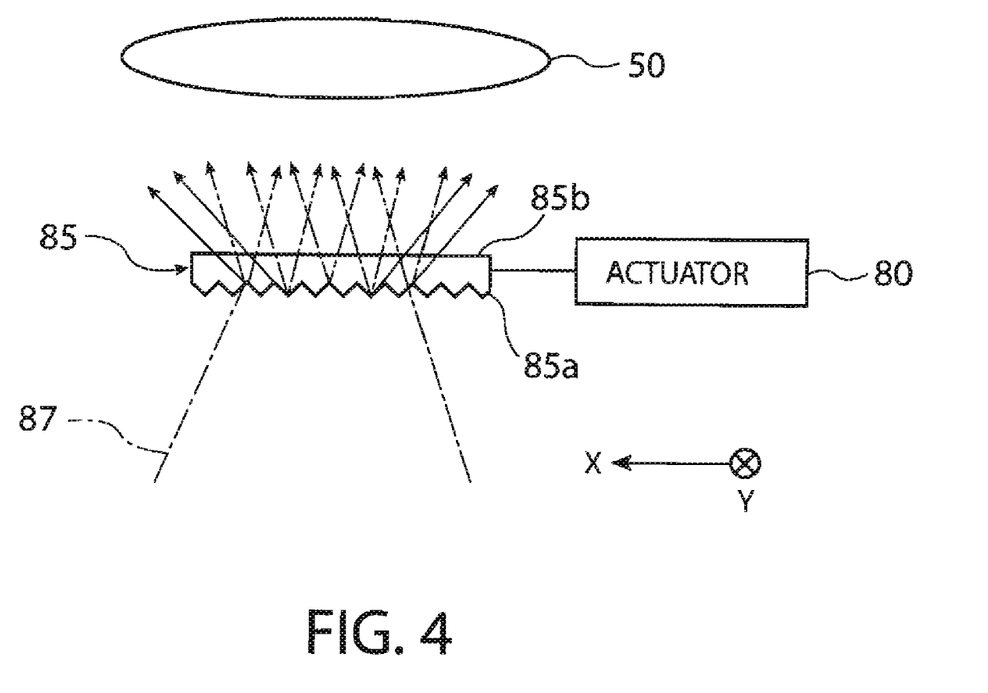
FIG. 4 is a plan view showing a state of a laser beam emitted from a light diffusion member in FIG. 3.

Referring now to FIG. 3 and FIG. 4, a second embodiment of the invention will be described. In the respective embodiments described below, the parts common in structure to the projector 1 in the first embodiment will be represented by the same reference numerals and description will not be made.

A projector 70 according to the second embodiment is different from that in the first embodiment in the structure of a light source device 71 and a point in which an actuator (moving unit) 80 is provided as the diffused state changing unit.

The light source device 71 is provided with a red laser diode 71R that emits a red laser beam, a green laser diode 71G that emits a green laser beam, and a blue laser diode 71B that emits a blue laser beam as shown in FIG. 3. The laser diodes 71R, 71G, and 71B output laser beams of high intensity according to the image signal from the control circuit 60. The light source device 71 includes a first dichroic mirror 72 that transmits a laser beam emitted from the red laser diode 71R and reflects a laser beam emitted from the green laser diode 71G and a second dichroic mirror 73 that transmits a laser beam emitted from the red laser diode 71R and reflects the laser beam emitted from the blue laser diode 71B.

The galvanometer mirror 30 that is capable of rotating about two axes of the X-axis and the Y-axis is employed in the first embodiment. However, in the second embodiment, a X-scanner (scanning unit) 81 that is capable of rotating only in the X-axis direction is employed and, instead of the reflection mirror 51 in the first embodiment, a Y-scanner (scanning unit) 82 that is capable of rotating only in the Y-axis direction is employed.

An incoming surface 85a of a light diffusion plate 85 is formed of a plate-shaped frost glass having minute projections and depressions like the light diffusion plate 40 according to the first embodiment as shown in FIG. 4. The light source device 71, the X-scanner 81, the Y-scanner 82, and the light diffusion plate (light diffusion member) 85 are controlled by the control circuit 60.

The actuator 80 drives the light diffusion plate 85, and is capable of moving the light diffusion plate 85 in the incoming surface 85a as shown in FIG. 4. In other words, the actuator 80 can move the light diffusion plate 85 in the X-axis direction by the control circuit 60, and temporarily changes the diffused state of the laser beam emitted from an outgoing surface 85b of the light diffusion plate 85. Accordingly, a laser beam 87 incoming from the incoming surface 85a of the light diffusion plate 85 is diffused when going out from the outgoing surface 85b and directed toward the projection lens 50 as shown in FIG. 4. The actuator 80 is moved at a speed of at least about 70 Hz.

The X-scanner 81 performs scanning in the X-axis direction with the laser beam emitted from the light source device 10 by the actuator 80 and converged by the converging lens 20. The Y-scanner 82 performs scanning in the Y-direction with the laser beam diffused by the light diffusion plate 85 and converged by the projection lens 50.

As regards the actuator 80; an electromagnetic actuator that moves the light diffusion plate 85 in the X-axis direction by an electromagnetic force may be employed. A piezoelectric element which is expanded and contracted (or distorted) by application of a voltage may also be employed as an actuator (piezoactuator).

Subsequently, a method of protecting an image on the screen 52 using the projector 70 according to this embodiment will be described.

When respective laser diodes 10R, 10G, 100B are driven, red light, blue light and green light are emitted from the respective laser diodes 10R, 10G and 10B. Then, the red light, the blue light and the green light are converged by the converging lens 20, and then used for scanning by the X-scanner 81 in the X-axis direction and is emitted to the light diffusion plate 85. Since the light diffusion plate 85 is moved in the X-axis direction by the actuator 80, the laser beam incoming into the light diffusion plate 85 is uniformized, and hence a laser beam in which occurrence of the speckle pattern is reduced is obtained. Subsequently, the laser beam is projected to the Y-scanner 82 by the projection lens 50, where the beam is used for scanning in the Y-axis direction by the Y-scanner 82, and then projected on the screen 52

In the projector 70 according to the aspect of the invention, since the laser beam emitted from the light source device 71 is diffused by the light diffusion plate 85, the laser beam projected on the screen 52 is lowered in coherence and hence occurrence of dazzling (scintillation, speckle) is restrained. The light diffusion plate 85 is moved in the incoming surface 85a by the actuator 80 and the diffused state of the laser beam emitted from the light source device 71 is temporarily changed. Accordingly, in the laser beam going out from the light diffusion plate 85 and projected on the screen 52 by the projection lens 50, uneven brightness is alleviated and the rough impression is eliminated. Therefore, downsizing of the entire projector 70 is possible, and an image with good quality can be displayed on the screen 52.

Third Embodiment of the Projector

Figure 5:
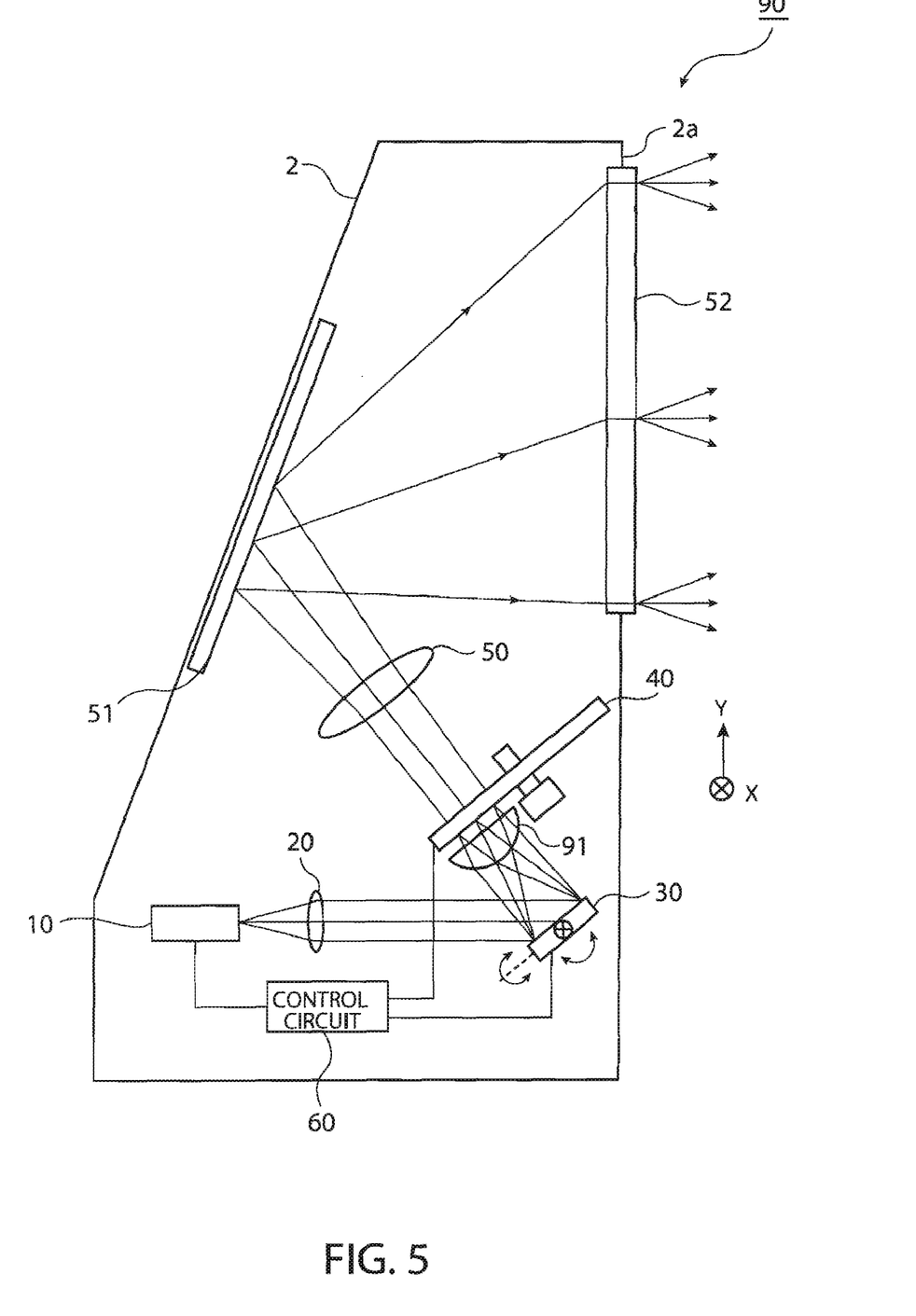
FIG. 5 is a schematic drawing showing a structure of a projector according to a third embodiment of the invention.
Figure 6:
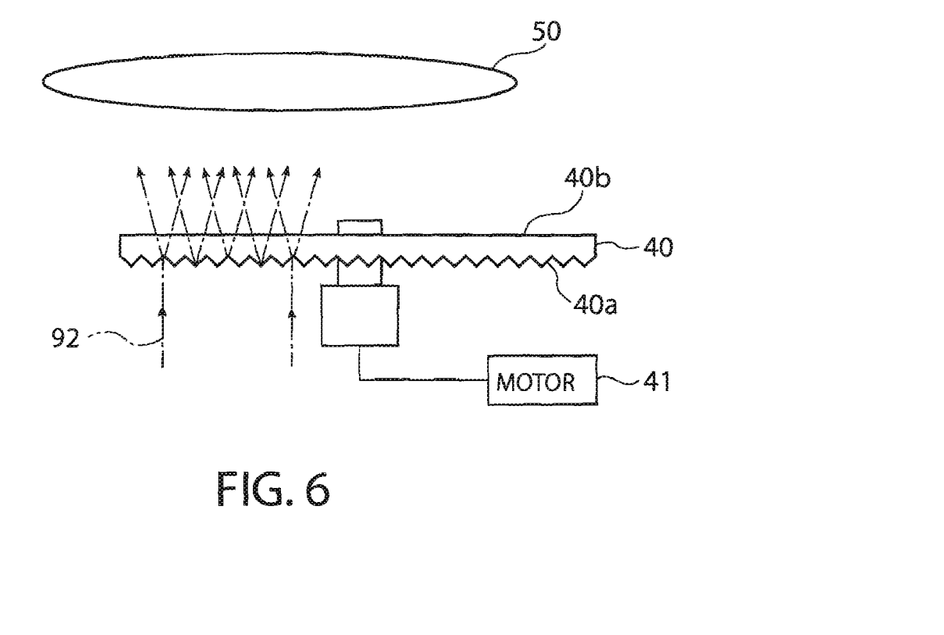
FIG. 6 is a plan view showing a state of a laser beam emitted from a light diffusion member shown in FIG. 5.

Referring now to FIG. 5 and FIG. 6, a third embodiment according to another aspect of the invention will be described.

In a projector 90 according to the third embodiment is different from the first and second embodiments in that a field lens (collimating unit) 91 is provided.

The field lens 91 can be arranged on the upstream sides of the light diffusion plates 40, 85 of the projectors 1, 70 in the first and second embodiments. In the third embodiment, the first embodiment will be described as an example.

The field lens 91 is provided between the galvanometer mirror 30 and the light diffusion plate 40 as shown in FIG. 5, and is adapted to collimate the laser beam reflected from the galvanometer mirror 30, and cause the collimated laser beam to be entered into the light diffusion plate 40 as shown in FIG. 6. Accordingly, a laser beam 92 incoming from the incoming surface 40a of the light diffusion plate 40 is converted into the laser beam having the directivity toward the projection lens 50 in the substantially vertical direction with respect to the light diffusion plate 40 when going out from the outgoing surface 40b.

In the protector 90 according to the aspect of the invention, the light beam emitted from the light source device 10 and used for scanning by the galvanometer mirror 30 passes through the field lens 91 and enters the light diffusion plate 40. At this time, the laser beam going out from the light diffusion plate 40 is converted into the laser beam having directivity in the direction substantially vertical to the light diffusion plate 40. Therefore, the width of luminous flux going out from the light diffusion plate 40 and entering the projection lens 50 is covered within a predetermined range. In other words, since the NA of the projection lens 50 can be designed according to the field lens 91, the projection lens 50 can be designed easily.

The technical scope of the invention is not limited to the above-described embodiments, and various modifications can be made without departing the scope of the invention.

For example, a liquid crystal panel can be employed as the diffused state changing unit. When the liquid crystal panel is employed, the laser beam can be diffused by changing the phase distribution of spatial light by an electric signal.

The liquid crystal panel may be, for example, of the one in which liquid crystal is encapsulated between two substrates which are not parallel to each other. In this arrangement, the cell gaps in the liquid crystal panel become uneven in the plane of the substrate. Therefore, the spatial phase distribution of the laser beam does not change at a time, and is temporarily different. Consequently, since the dazzling pattern in the projected image changes temporarily, and hence is time-integrated by after image effect, whereby dazzling is almost insensible.

Figure 7:
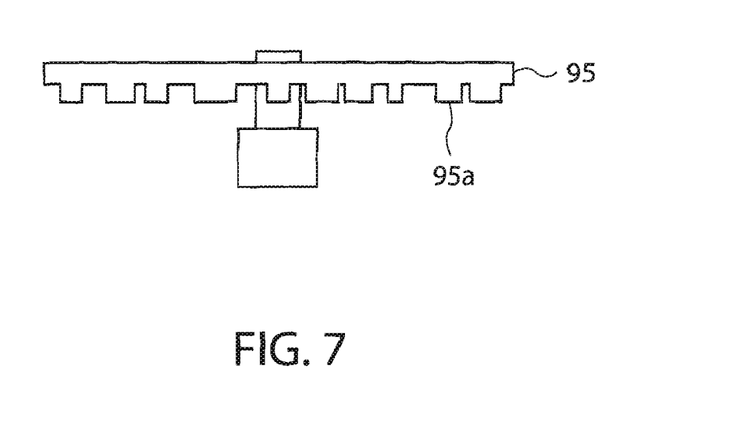
FIG. 7 is a plan view showing a modification of the light diffusion member in the respective embodiments.

Although the frost glass is employed as the light diffusion plates 40, 85, the invention is not limited thereto, and may be any thing as long as they can diffuse the incoming laser beam. For example, as shown in FIG. 7, it may be a phase difference plate 95 formed of a glass with a pattern having randomly formed projections and depressions on the surface 95a thereof by a known technology of photolithography. The projections and depressions formed on the surface 95a of the glass may be a diffraction grating having a cyclic optical pattern. In this arrangement, the laser beam incoming into the phase difference plate 95 is provided partly with the phase difference in the course of passing through the phase difference plate 95. With the arrangement of the phase difference plate 95 as described above, the occurrence of the speckle pattern in the laser beam can be prevented as in the case of the light diffusion plates 40, 85. The light diffusion plates 40, 85 may be replaced by a holographic grating, HOE (holographic optical element) and so on utilizing interference of the laser beam.

The light diffusion plate is not limited to the one having permeability as described above, and may be the one that reflects the incoming laser beam and diffuses the same.

The entire disclosure of Japanese Patent Application No. 2005-210059, filed July 20 is expressly incorporated by reference herein.

What is claimed is:

1. A projector comprising:
    a light source device that emits a laser beam toward a projected surface;
    a scanning unit that scans the laser beam emitted from the light source device;
    a light diffusion member that diffuses the laser beam output from the scanning unit, and further comprising a diffused state changing unit that temporarily changes the diffused state of the laser beam emitted from the light diffusion member; and
    a converging unit that converges the laser beam going out from the light diffusion member on the projected surface;
    wherein the light diffusion member receives the laser beam directly from the scanning unit.

2. The projector according to claim 1 comprising another converging unit that converges the laser beam emitted from the light source device onto the light diffusion member.

3. The projector according to claim 1, wherein the diffused state changing unit is a rotational unit that rotates the light diffusion member within an incoming surface of the light diffusion member.

4. The projector according to claim 1, wherein the diffused state changing unit is a moving unit that moves the light diffusion member within the incoming surface of the light diffusion member.

5. A projector comprising:
    a light source device that emits a laser beam toward a projected surface;
    a scanning unit that scans the laser beam emitted from the light source device in a two-dimensional direction;
    a light diffusion member that diffuses the laser beam output from the scanning unit, and further comprising a diffused state changing unit that temporarily changes the diffused state of the laser beam emitted from the light diffusion member;
    a first converging unit that converges the laser beam going out from the light diffusion member on the projected surface; and
    a second converging unit that converges the laser beam emitted from the light source device onto the light diffusion member,
    wherein the light diffusion member receives the laser beam directly from the scanning unit.

6. The projector according to claim 5, wherein the diffused state changing unit is a rotational unit that rotates the light diffusion member within an incoming surface of the light diffusion member.

7. The projector according to claim 5, wherein the diffused state changing unit is a moving unit that moves the light diffusion member within the incoming surface of the light diffusion member.

8. A projector comprising:
    a light source device that emits a laser beam toward a projected surface;
    a first scanning unit that scans the laser beam emitted from the light source device in a first-axis direction;
    a light diffusion member that diffuses the laser beam output from the first scanning unit, and further comprising a diffused state changing unit that temporarily changes the diffused state of the laser beam emitted from the light diffusion member, wherein the diffused state changing unit is a rotational unit that rotates the light diffusion member within an incoming surface of the light diffusion member; and
    a first converging unit that converges the laser beam going out from the light diffusion member on the projected surface;
    a second converging unit that converges the laser beam emitted from the light source device onto the light diffusion member;
    a second scanning unit that scans the laser beam scanned by the first scanning unit and diffused by the light diffusion member in a second-axis direction perpendicular to the first-axis direction.

9. The projector according to claim 8, further comprising a collimating unit that collimates the laser beam emitted from the scanning unit.

* * * * *